April 30, 1957  A. A. WROBEL  2,790,195
WINDSHIELD WIPER ARM
Filed Dec. 2, 1954
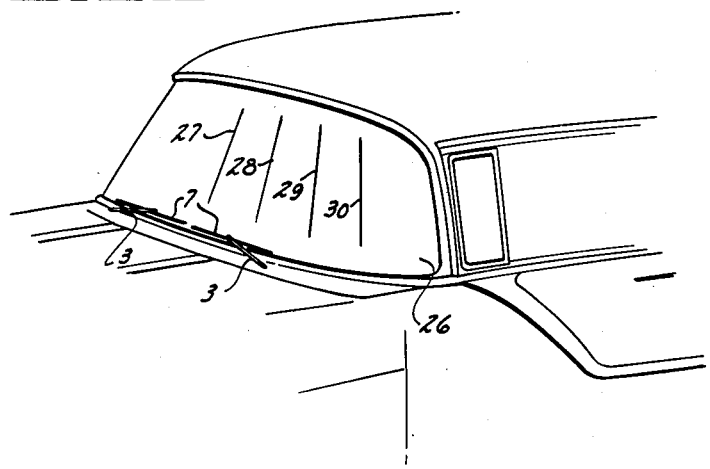
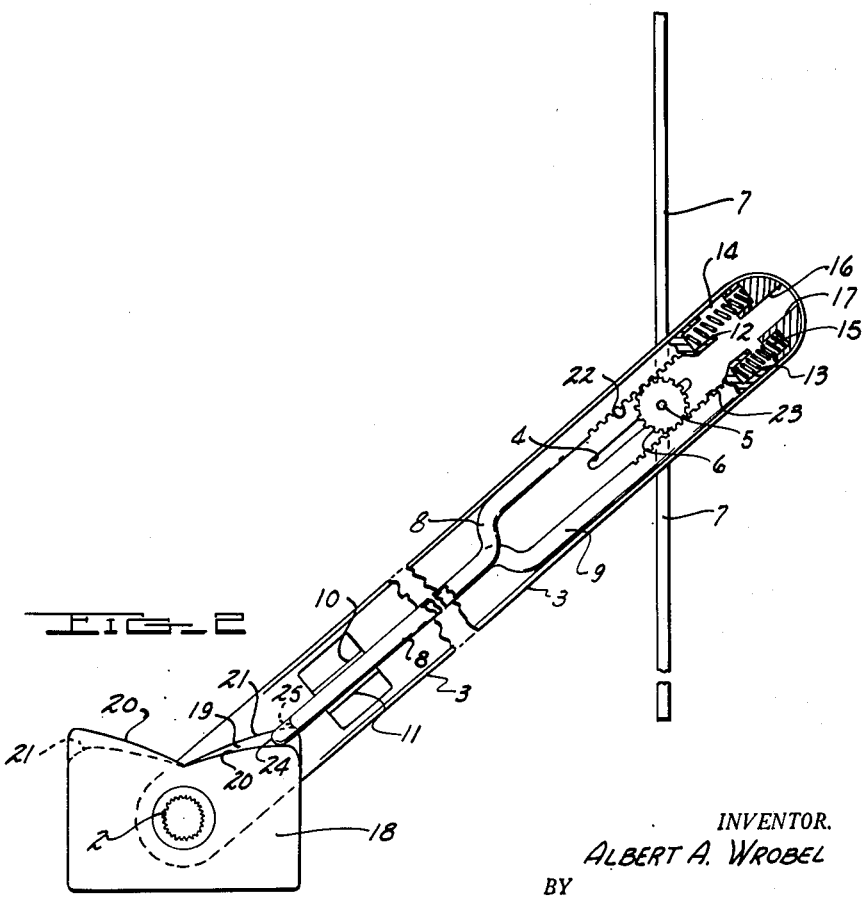
INVENTOR.
ALBERT A. WROBEL
BY
SMITH, OLSEN & KOTTS
ATTORNEYS

United States Patent Office 2,790,195
Patented Apr. 30, 1957

2,790,195

WINDSHIELD WIPER ARM

Albert A. Wrobel, Inkster, Mich., assignor to General Motors Corporation, Detroit, Mich., a corporation of Delaware Application December 2, 1954, Serial No. 472,549

9 Claims. (Cl. 15—255)

This invention relates to an automobile windshield wiper mechanism.

Most windshield wiper mechanisms at present are so constructed as to be provided with a pivotable arm for retaining and guiding the wiper over the windshield. The wiper blade is at all times positioned parallel to the arm so that the blade describes the same arc as the arm.

One objection to the above mentioned type of wiper mechanism is that the portion of the wiper blade adjacent the center of the arc travels through a comparatively short arc and wipes but a comparatively small portion of the windshield. Insofar as windshield coverage is concerned, the utility of this type wiper mechanism is therefore limited and curtailed as compared with a desired wiper mechanism wherein the blade would at all times extend in substantially a vertical plane to the top and bottom limits of the windshield, and wherein the blade would move in substantially a horizontal direction across the windshield. In this connection it will be realized that pivoting of the wiper blade to effect its motion prevents the use of wiper blades as long as the height of the windshield. Decreased blade lengths mean decreased blade coverage and decreased driver visibility.

Another objection to the pivotal type wiper mechanisms arises by virtue of the fact that many present day windshields are curved in vertical and horizontal directions in order to prevent sun glare from reaching the automobile driver's eyes. This curving of the windshield prevents the pivotally mounted wiper blade from contacting the windshield at all points along the wiper blade length, as is necessary if the blade is to satisfactorily clean the windshield.

One object of the present invention is to provide a windshield wiper mechanism wherein the wiper blade at all times in its operative movement extends to the top and bottom of the windshield, and wherein the blade moves in substantially a horizontal direction across the windshield, whereby the coverage per blade travel is at a maximum.

Another object of the invention is to provide a wiper mechanism which is adapted for use on horizontally and/or vertically curved windshields. This object is attained by so designing the wiper mechanism that the wiper blade at all times extends in the planes taken by the vertical curves and at right angles to the planes taken by the horizontal curves. The result is that the blade at all times conforms to the windshield so as to contact the windshield at all points along the wiper blade length.

Another object of the invention is to provide a wiper mechanism having the desired coverage per blade travel and adaptability for use on curved windshields which is so constructed as to be capable of use with conventional windshield wiper motors.

Other objects of this invention will appear in the following description and appended claims, reference being had to the accompanying drawings forming a part of this specification wherein like reference characters designate corresponding parts in the several views.

In the drawings:

Fig. 1 is a perspective view of an automobile windshield with which the invention may be utilized.

Fig. 2 is an elevational view of one embodiment of the invention which may be utilized with the automobile windshield shown in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, the mechanism there shown will be seen to include a wiper shaft 2 rotatably supported in the cowl of the vehicle, and which is rotated about its axis alternately in clockwise and counterclockwise directions by a conventional windshield wiper motor (not shown). One end of shaft 2 has fixedly secured thereto a hollow arm 3 which is provided with a slot 4 for the slidable reception of a pin 5. Thus, the wiper arm 3 is drivingly connected to the shaft 2 for oscillation therewith. Pin 5 extends from a gear 6 into non-rotatable engagement with a wiper blade 7. Pin 5 and gear 6 make up what might be termed a wiper blade mounting means. Gear 6 makes meshing engagement with teeth 22 and 23 on two rack-forming bar members 8 and 9 which are slidably received in guides 10 and 11 struck out from one wall of arm 3. The upper ends of bar members 8 and 9 are socketed at 12 and 13 for the reception of the lower end portions of two compression springs 14 and 15. Springs 14 and 15 have their upper end portions received in two socket-forming members 16 and 17 which are secured at the outer end of arm 3. The function of springs 14 and 15 is to force bar members, or cam follower means, 8 and 9 down into riding engagement with two overlapping cam members 18 and 19 which are fixedly secured on the automobile housing, or vehicle cowl. The cam members 18 and 19 have aligned apertures therein, and the wiper shaft 2 extends through the aligned apertures in the cam members. Cam members 18 and 19 are provided with cam surfaces 20 and 21 which are contacted by the lower ends 24 and 25 of the bar members 8 and 9. Different points on cam surfaces 20 and 21 are spaced different radial distances from wiper shaft 2 so that as arm 3 oscillates around the axis of shaft 2 (by operation of the windshield wiper motor), bars 8 and 9 will be caused to move back and forth on arm 3. Additionally the radial spacing between cam surfaces 20 and 21 varies at different points along the cam surfaces so that as arm 3 oscillates around the axis of shaft 2 bars 8 and 9 will be caused to move along arm 3 at different rates according as the radial distance between cam surfaces 20 and 21 is varied. For example, when arm 3 is moved in a counterclockwise direction from its illustrated position bars 8 and 9 will ride along surfaces 20 and 21 and toward the axis of shaft 2. Pin 5 will thereby move downward relative to slot 4, but since arm 3 has an upward component of motion pin 5 will move in substantially a horizontal direction relative to the windshield. Additionally, since the radial distance between cam surfaces 20 and 21 is decreasing bar 8 will move toward shaft 2 at a slower rate than bar 9, with the result that gear 6 will rotate in a clockwise direction about its axis. Bar 8, therefore, functions to translate the faster movement of bar 9 into rotary movement of gear 6. Clockwise rotation of gear 6 will cause blade 7 to pivot about the axis of gear 6 in a clockwise direction but since the motion of arm 3 is such as would tend to pivot blade 7 in a counterclockwise direction, the opposing motions of gear 6 and arm 3 are balanced and the wiper blade can be maintained in a vertical plane as illustrated. The position taken by blade 7 permits the use of longer than conventional blade lengths since the blade has no up or down motion relative to the windshield.

Clockwise rotation of gear 6 causes said gear to move down along slot 4 in an amount equal to the change in radial distance between cam surfaces 20 and 21. Such downward movement of the gear must be considered in the design of cam surfaces 20 and 21.

If the wiper mechanism is to be used on a flat windshield the design of surfaces 20 and 21 will be such as to maintain blade 7 in a vertical plane throughout its movement. If, however, the wiper mechanism is to be used on a horizontally and vertically curving windshield the design of surfaces 20 and 21 will be such as to maintain blade 7 in the planes taken by the vertical curves and at right angles to the planes taken by the horizontal curves. Except for the "wrap-around" portion 26 and disregarding the vertical curves, the windshield is generally formed as a conical surface with the apex of the cone well above the roof of the automobile. In order that all portions of the wiper blade contact the windshield it is desirable that the blade extend toward the apex as indicated by the lines 27, 28, 29 and 30 appearing in Fig. 1. The blade must, therefore, experience a slight pivotal movement around the apex and always be at right angles to the horizontal curves. The desired movement of blade 7 is made possible by so regulating the radial distance between cam surfaces 20 and 21 as to give a desired predetermined rotation to gear 6 and a corresponding rotation to blade 7.

It is desirable for purposes of driver visibility that when the wiper mechanism is idle the wiper blade should take the horizontal position shown in Fig. 1. Therefore, the wiper motor is preferably of such construction that when it is turned off it causes arm 3 to move in a clockwise direction down beyond the illustrated position to a parked position outside of the wiping stroke. Such movement of arm 3 causes bar member 8 to move radially in an outward direction with respect to bar 9. Gear 6 is thereby turned in a clockwise direction so as to pivot wiper blade 7 into the plane of arm 3. Blade 7 is thereby enabled to take the idle, or parked, position shown in Figure 1.

The illustrated wiper mechanism is considered advantageous in that the wiper blade can be made to travel in substantially a horizontal direction across the windshield without any up and down movement, thereby permitting longer than conventional blade lengths and increased windshield coverage. The illustrated wiper mechanism has a further advantage in that it adapts itself for use on horizontally curved windshields by permitting the blade to take operative positions at right angles to the horizontal curves and thereby make wiping contact with the windshield at all points along the wiper blade length.

I claim:

1. A wiper mechanism for a vehicle comprising an oscillatable shaft supported in said vehicle, an arm drivingly connected to said shaft for oscillation therewith, two fixed cams supported on said vehicle, a pair of bar members mounted for movement along said arm, each of said bar members having one of its ends in riding engagement with one of the cams, means between the bar members for mounting a wiper blade, said means being engaged with each of said bar members, whereby as said arm travels through its oscillatory movement said bar members will move longitudinally along the arm at different rates, thereby causing the blade mounting means to have a pivotal movement with respect to the bar members and a translatory movement with respect to the arm.

2. A wiper mechanism for a vehicle comprising, an oscillatable shaft supported in said vehicle, an arm drivingly connected to said shaft for oscillation therewith, two fixed cams supported on said vehicle having cam surfaces of changing radial dimensions throughout the arc of arm travel, a pair of bar members mounted for movement along said arm, each of said bar members having one of its ends in riding engagement with one of the cams, means between the bar members for mounting a wiper blade, whereby as said arm travels through its oscillatory movement said bar members will move longitudinally along the arm at different rates, thereby causing the blade mounting means to have a pivotal movement with respect to the bar members and a translatory movement with respect to the arm.

3. A wiper mechanism for a vehicle comprising, an oscillatable shaft supported in said vehicle, an arm drivingly connected to said shaft for oscillation therewith, two diverse cams fixedly mounted on said vehicle adjacent the shaft for said arm, the radial distances between cam faces varying in accordance with the different positions occupied by the arm in its oscillatory movement, a pair of bar members mounted for movement along said arm, each of said bar members having one of its ends in riding engagement with one of the cams, means between the bar members for mounting a wiper blade, said means being engaged with each of said bar members, whereby as said arm travels through its oscillatory movement said bar members will move longitudinally along the arm at different rates accordingly as the radial distance between cam faces is varied, thereby causing the blade mounting means to have a pivotal movement with respect to the bar members and a translatory movement with respect to the arm.

4. A wiper mechanism for a vehicle comprising, an oscillatable shaft supported in said vehicle, an arm drivingly connected to said shaft for oscillation therewith, two diverse cams fixedly mounted on said vehicle adjacent the shaft for said arm, the radial distances between cam faces increasing and decreasing throughout the arc of arm travel, a pair of bar members mounted for movement along said arm, each of said bar members riding on one of the cams, means between the bar members for mounting a wiper blade, whereby as said arm travels through its oscillatory movement said bar members will move longitudinally along the arm accordingly as the radial distance between cam faces is varied, thereby causing the blade mounting means to have a pivotal movement with respect to the bar members.

5. A wiper mechanism for a vehicle comprising, an oscillatable shaft supported in said vehicle, an arm drivingly connected to said shaft for oscillation therewith, two diverse cams fixedly mounted on said vehicle adjacent the shaft, each cam being of changing radial dimension as measured from the shaft, the radial distance between cam surfaces varying throughout the arc of arm travel, a pair of bar members mounted for movement along said arm, each of said bar members riding on one of the cams, means between the bar members for mounting a wiper blade, whereby as said arm travels through its oscillatory movement said bar members will move longitudinally along the arm at different rates accordingly as the radial dimension of each cam is changed and as the radial distance between cam surfaces is varied, thereby causing the blade mounting means to have a translatory movement with respect to the arm and a pivotal movement with respect to the bar members 6. A wiper mechanism for a vehicle comprising, an oscillatable shaft supported in said vehicle, an arm drivingly connected to said shaft for oscillation therewith, a cam fixedly mounted on said vehicle adjacent the shaft and being of changing radial dimension as measured in different radial directions from the shaft, a bar member mounted on the arm and riding on the cam so as to move along the arm throughout arm travel in accordance with the change in radial dimension of the cam and means engaged with said bar member for mounting a wiper blade for pivotal and translatory movement relative to said arm during movement of said bar member along the arm.

7. A wiper mechanism for a vehicle comprising, an oscillatory shaft supported in said vehicle, and arm drivingly connected to said shaft for oscillation therewith, a pair of diverse cams fixedly mounted on said vehicle adjacent the shaft and being of changing radial dimensions as measured in different radial directions from the pivot, the radial distance between cam surfaces varying throughout the arc of arm travel, a pair of toothed bar members mounted for movement along said arm, each of said bar members riding on one of the cams, gear means engaging the teeth of both bar members and serving to mount a wiper blade, whereby as said arm travels through its oscillatory movement said bar members will move longitudinally along the arm at different rates accordingly as the radial dimension of each cam is changed and as the radial distance between cam surfaces is varied, thereby causing the gear to have a translatory movement with respect to the arm and a pivotal movement with respect to the bar members.

8. Windshield cleaner mechanism for a vehicle including, an oscillatory wiper shaft supported in said vehicle, a wiper arm drivingly connected with said shaft so as to be oscillated thereby throughout a wiping stroke and movable to a parked position, stationary cam means attached to said vehicle adjacent said shaft, a piper blade, means mounting said wiper blade for pivotal movement relative to said arm, and cam follower means supported by said arm and movable relative thereto, said cam follower means engaging said cam means and having operative connection with said blade mounting means for pivoting said blade out of alignment with said arm during the wiping stroke and into alignment with said arm when the arm is moved to the parked position.

9. Windshield cleaner mechanism for a vehicle including, an oscillatory wiper shaft supported in said vehicle, a wiper arm drivingly connected with said shaft so as to be oscillated thereby throughout a wiping stroke, stationary cam means attached to said vehicle adjacent said shaft, a wiper blade, means mounting said blade for pivotal and translatory movement relative to said arm, and cam follower means supported by said arm and movable relative thereto, said cam follower means engaging said cam means and having operative connection with said blade mounting means for effecting pivotal and translatory movement of the wiper blade during the wiping stroke.

References Cited in the file of this patent

UNITED STATES PATENTS

| | | |
|---|---|---|
| 2,079,399 | Drew et al. | May 4, 1937 |
| 2,286,449 | Wahlberg | June 16, 1942 |

FOREIGN PATENTS

| | | |
|---|---|---|
| 855,665 | France | Feb. 19, 1940 |